252. COMPOSITIONS,
103

UNITED STATES PATENT OFFICE.

MORRIS GOLDSTEIN, OF NEW YORK, N. Y., ASSIGNOR TO EXOLD MANUFACTURING COMPANY, OF NEW YORK, N. Y., A CORPORATION OF NEW YORK.

PAINT AND VARNISH REMOVER.

1,045,785.   Specification of Letters Patent.   Patented Nov. 26, 1912.
No Drawing.   Application filed March 9, 1910.  Serial No. 548,228.

*To all whom it may concern:*

Be it known that I, MORRIS GOLDSTEIN, a subject of the Czar of the Empire of Russia, residing in the borough of Manhattan, of the city of New York, in the county and State of New York, have invented a new and useful Composition of Matter to be Used as a Paint and Varnish Remover, of which the following is a specification.

My composition consists of the following constituent ingredients, combined in the stated proportions (fixed by weight) viz: two hundred and twenty six parts of water, eight parts of muriatic acid, forty per cent., forty parts of caustic soda, eight parts of bleached Irish moss, five parts of acetic acid, (36%,) thirty two parts of peroxid of hydrogen, (3%,) one part of hypochlorite of soda.

My process for producing or manufacturing said composition consisting of the constituent ingredients described is to mix (a) eight parts of muriatic acid with (b) one hundred and ninety two parts water and (c) to dissolve therein forty parts of caustic soda; to add to this mixture, after the same has stood until cool, a thickening or stiffening substance which is obtained by boiling (d) eight parts of bleached Irish moss in (e) a mixture consisting of thirty four parts water and five parts acetic acid, for a period of about ten minutes, stirring at the same time, until the boiled matter becomes a thick or gelatinous mass, then, after the same has stood until cool by adding to and mixing with the said boiled matter about sixteen parts of the above described mixture consisting of water, muriatic acid and caustic soda and by straining through a sieve the fluid or partly fluid portion thereof, which fluid or partly fluid matter is the thickening substance mentioned; then to add to the above described mixture (f) thirty two parts of peroxid of hydrogen; then to add thereto (g) one part of hypochlorite of soda, and to commingle and mix all said ingredients and solutions thoroughly, so that the same properly combine. The composition so made is of a uniform consistency and slightly colored; it has a great advantage over free-flowing liquid paint removers in that it has sufficient body or thickening to prevent it, when applied to surfaces, from overrunning adjoining parts of such surfaces.

The composition may best be used by applying the same by brush or other convenient implement to surfaces or articles coated with the paint, varnish or other substance to be removed, and by allowing it to soak into or commingle with said substance, until the same shall become thoroughly impregnated with the detergent and wet, soft or gelatinous, and then to remove such substance by means of a sponge, brush or other convenient implement, moistened with water.

The above described detergent has been found, after careful experiments, to be most effective and useful when made according to the process and in the manner above stated; it may, however, be practicable to mix or combine the various constituent ingredients in a different order and manner, without affecting the nature, the substance or the efficiency of the composition, and the invention of the above described composition is not intended to be made dependent upon the observance of the above described invented process.

The composition is found to be most efficient when all the above mentioned constituent ingredients are used in the above stated proportions; it is, however, not essential that the said ingredients should be mixed exactly in the proportions stated; but any substantial change in the proportions used will render the detergent less useful, though such change may not wholly deprive the composition of its efficiency.

I am aware other compositions containing one or more of the above ingredients have been used for the same or similar purpose or purposes and that patents therefor have been granted to the respective inventors thereof; but I am not aware that all the ingredients of my composition have been used together.

I claim—

1. The herein described composition of matter to be used for the removal of paint, varnish and like substances from surfaces or articles coated therewith, the constituent ingredients of which are the following: water; muriatic acid; caustic soda; bleached Irish moss; acetic acid; peroxid of hydrogen and hypochlorite of soda, substantially as described.

2. The herein described composition of matter to be used for the removal of paint, varnish and like substances from surfaces or articles coated therewith, the constituent ingredients of which are as follows in approximately the stated proportions (fixed by weight) viz: two hundred and twenty six parts of water; eight parts of muriatic acid; forty parts of caustic soda; eight parts of bleached Irish moss; five parts of acetic acid (36%); thirty two parts of peroxid of hydrogen (3) and one part of hypochlorite of soda, substantially as described for the purposes specified.

MORRIS GOLDSTEIN.

Witnesses:
GEORGE W. LORD,
WM. A. BARTOW.

Copies of this patent may be obtained for five cents each, by addressing the "Commissioner of Patents, Washington, D. C."